US005555186A

United States Patent [19]
Shioya

[11] Patent Number: 5,555,186
[45] Date of Patent: Sep. 10, 1996

[54] PROJECTION TYPE LIQUID CRYSTAL DISPLAY APPARATUS USING MULTIPLE POLARIZING BEAM SPLITTERS

[75] Inventor: Yukinori Shioya, Tokyo, Japan

[73] Assignee: NEC Corporation, Japan

[21] Appl. No.: 389,174

[22] Filed: Feb. 15, 1995

[30] Foreign Application Priority Data

Feb. 15, 1994 [JP] Japan .................................. 6-040445

[51] Int. Cl.$^6$ ........................ G02F 1/1335; G02B 27/12
[52] U.S. Cl. ............................ 359/40; 359/41; 359/72; 359/639
[58] Field of Search ............................ 359/40, 41, 48, 359/49, 72, 437, 438, 440, 639, 640, 497

[56] References Cited

U.S. PATENT DOCUMENTS

| | | | |
|---|---|---|---|
| 5,221,982 | 5/1993 | Faris | 359/93 |
| 5,283,600 | 2/1994 | Imai | 353/37 |

FOREIGN PATENT DOCUMENTS

| | | |
|---|---|---|
| 63-182987 | 7/1988 | Japan . |
| 2-29076 | 2/1990 | Japan . |
| 2-121779 | 10/1990 | Japan . |
| 3-152523 | 6/1991 | Japan . |
| 4-33821 | 2/1992 | Japan . |

Primary Examiner—William L. Sikes
Assistant Examiner—Fetsum Abraham
Attorney, Agent, or Firm—Ostrolenk, Faber, Gerb & Soffen

[57] ABSTRACT

First polarizing beam splitters have respective first polarization separating surfaces arranged perpendicularly to each other. Each of the first polarization separating surfaces transmits the P-polarization component of a light beam emitted from a light source and reflects its S-polarization component. Each of first light beam reflecting elements reflects the S-polarization component reflected by the first polarization separating surface and a light beam directly inputted from the light source. Second polarizing beam splitters have respective second polarization separating surfaces, each of which transmits the P-polarization component of the light beam inputted from the light source and reflected by the first light beam reflecting element and reflects the S-polarization component. Each of second light beam reflecting elements reflects toward a liquid crystal display device the P-polarization component transmitted from the second polarization separating surface. Phase plates convert the S-polarization components that have been separated by the first and second polariztion separating surfaces to P-polarization components by rotating their polarization directions by 90°.

3 Claims, 9 Drawing Sheets

ILLUMINANCE

ILLUMINANCE

ILLUMINANCE ↑

ILLUMINANCE ↑

PROJECTION TYPE LIQUID CRYSTAL DISPLAY APPARATUS USING MULTIPLE POLARIZING BEAM SPLITTERS

BACKGROUND OF THE INVENTION

The present invention relates to a projection type liquid crystal display apparatus using polarizing beam splitters and, more specifically, to a projection type liquid crystal display apparatus that can improve the efficiency of light utilization, reduce the apparatus size, and provide a uniform brightness distribution of a projection screen.

In recent years, with the increased need of displaying images on a large screen, projection type liquid crystal display apparatuses have come to be used, which project, with magnification, a display content of a small-size liquid crystal display device onto a screen or the like.

Figure 7:
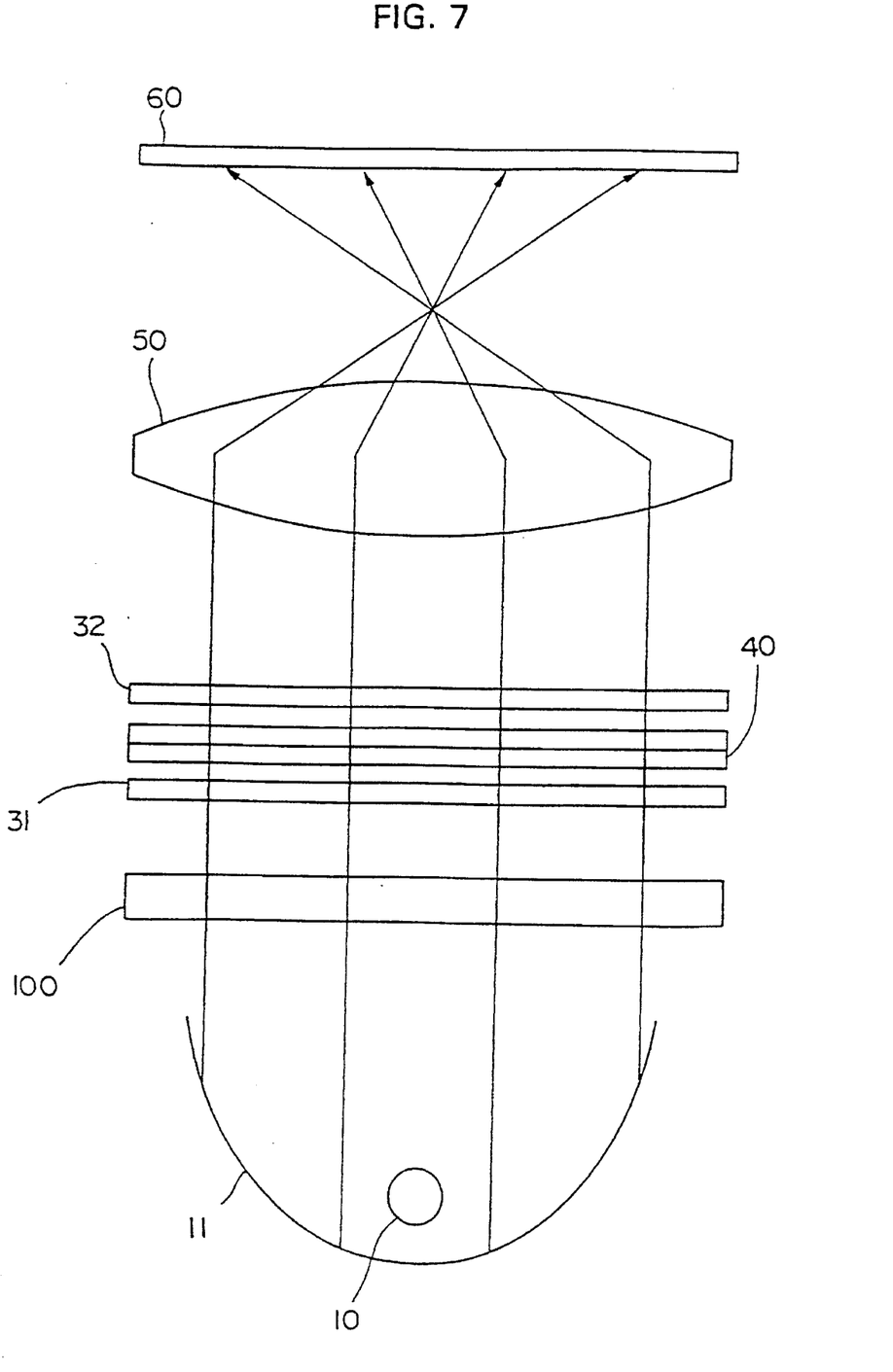
FIG. 7 is a block diagram showing a projection type liquid crystal display apparatus of a first conventional example.

FIG. 7 shows a configuration of a projection type liquid crystal display apparatus of a first conventional example. A high-intensity white light source 10 is a metal halide lamp, for instance. A parabolic reflecting mirror 11 reflects part of a light beam emitted from the light source 10, to produce a parallel light beam. A heat wave filter 100 absorbs or reflects heat waves of the light beam coming from the reflecting mirror 11. A polarizer 31 converts a heat-wave-eliminated parallel beam to linearly polarized light. A liquid crystal display device 40 modulates the linearly polarized light in accordance with an image signal. An analyzer 32 transmits only part of the linearly polarized light whose polarization direction is along its transmission axis. A projection lens 50 projects, with magnification, transmitted linearly polarized light onto a screen 60.

However, in the projection type liquid crystal display apparatus having the above configuration, of the light beam emitted from the light source 10, only the linearly polarized light that is transmitted by the polarizer 31 is used as illumination light for the liquid crystal display device 40, and the other linearly polarized light whose polarization direction is perpendicular to the linearly polarized light transmitted by the polarizer 31 is lost. That is, only about 40% of the light beam emitted from the light source 10 is used as the projection light. Therefore, the above projection-type liquid crystal display apparatus is low in the efficiency of light utilization and its projection screen is dark.

To solve the above problems, U.S. Pat. No. 5,283,600 (Japanese Patent Application No. Hei. 4-33821 filed Feb. 21, 1992) proposes a projection type liquid crystal display apparatus in which the polarization direction of linearly polarized light emitted from a light source is so converted as to become parallel with that of P- or S-polarization light, and which therefore can effectively utilize the light emitted from the light source as illumination light for a liquid crystal display device.

Figure 8:
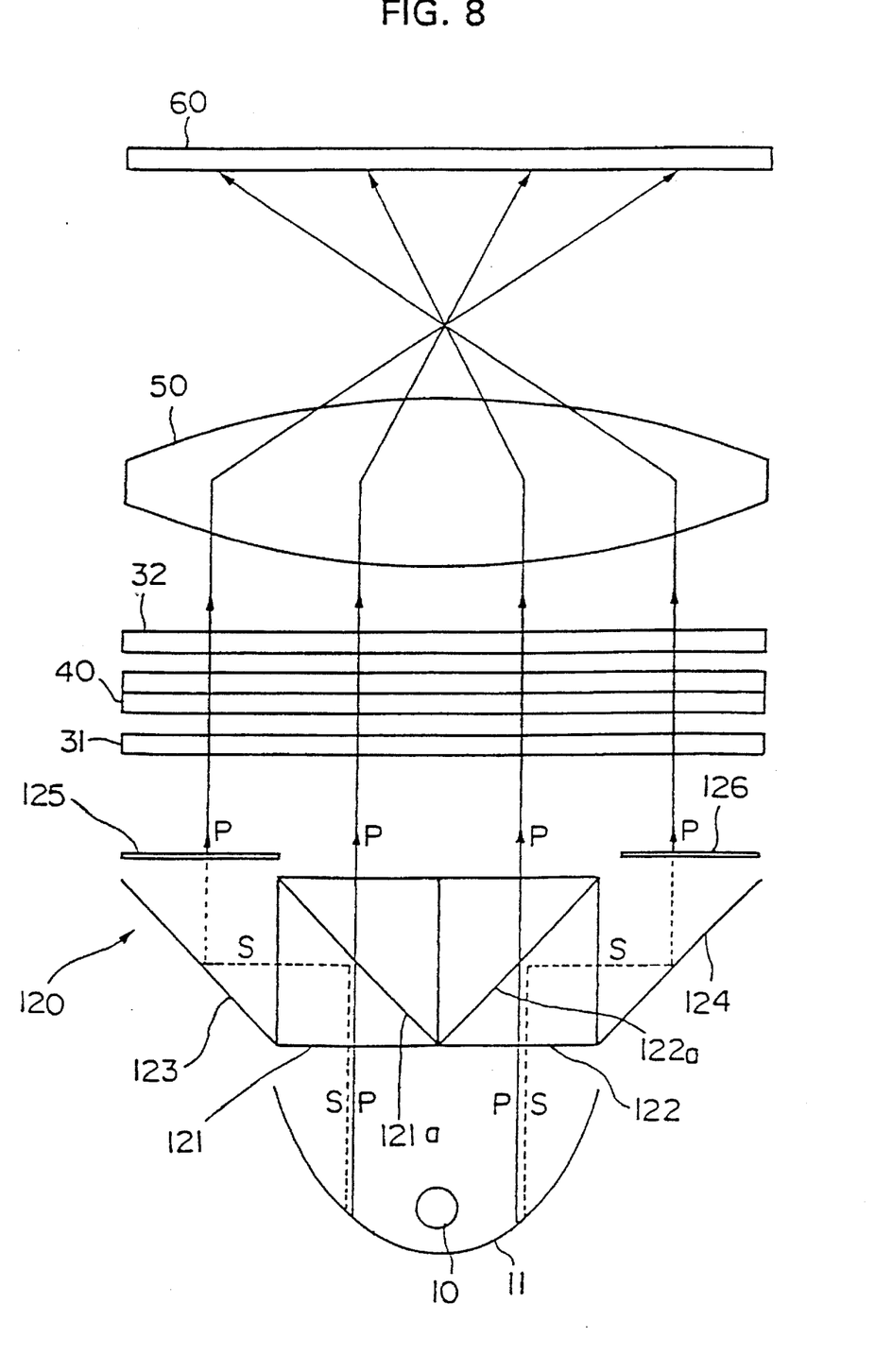
FIG. 8 is a block diagram showing a projection type liquid crystal display apparatus of a second conventional example.

Referring to FIG. 8, the projection type liquid, crystal display apparatus disclosed in above-mentioned application Hei. 4-33821 will be described as a second conventional example.

As shown in FIG. 8, a polarizing optical system 120 is composed of a polarizing beam splitters 121 and 122, light beam reflecting elements 123 and 124 and phase plates 125 and 126.

Linearly polarized light emitted from a light source 10 is made incident on the polarizing beam splitters 121 and 122, and separated into P- and S-polarization components by polarization separating surfaces 121a and 122a. That is, the polarizing beam splitters 121 and 122 transmit one of the P- and S-polarization components to the side of a liquid crystal display device 40 while reflecting the other component by the polarization separating surfaces 121a and 122a.

Mounted so as to be inclined, by about 45°, from the reflection light exit faces of the respective polarizing beam splitters 121 and 122, the light beam reflecting elements 123 and 124 reflects the reflection light beams coming from the polarization separating surfaces 121a and 122a toward the liquid crystal display device 40.

Disposed in optical paths of the respective reflection light beams reflected by the light reflecting elements 123 and 124, the phase plates 125 and 126 transmit the reflection light beams while performing phase conversion on those light beams. The phase plates 125 and 126 converts the polarization direction of the reflection light beams into a direction that is parallel with that of the transmission light beams from the polarizing beam splitters 121 and 122.

Other projection type liquid crystal display apparatuses using a polarizing beam splitter are disclosed, for instance, in Japanese Unexamined Patent Publication No. Hei. 3-152523 (published Jun. 28, 1991) and Japanese Unexamined Utility Model Publication Nos. Hei. 2-29076 (published Feb. 23, 1990) and Hei. 2-121779 (published Oct. 3, 1990).

However, in the projection-type liquid crystal display apparatus of U.S. Pat. No. 5,283,600, the light beam emitted from the light source 10 is separated into two parts going rightward and leftward by the two polarizing beam splitters 121 and 122. The polarizing beam splitters 121 and 122 occupy a large space in the optical axis direction, causing a problem that the apparatus is large and heavy. In addition, the large polarizing beam splitters 121 and 122 make the apparatus expensive.

Figure 9A:
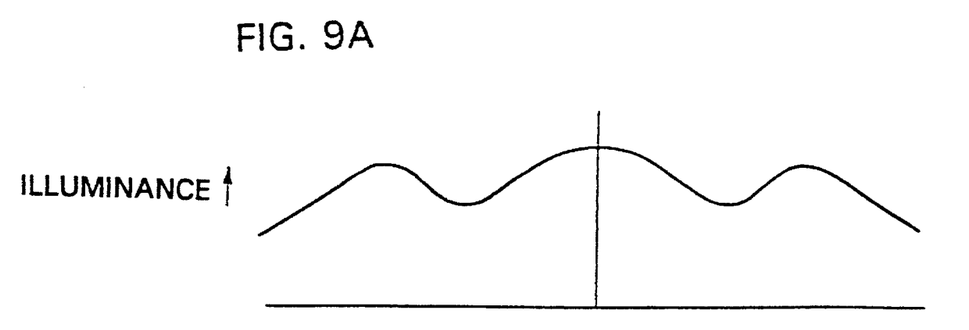
FIG. 9 illustrates an illuminance distribution of illumination light in the projection type liquid crystal display apparatus of the second conventional example.
Figure 9B:
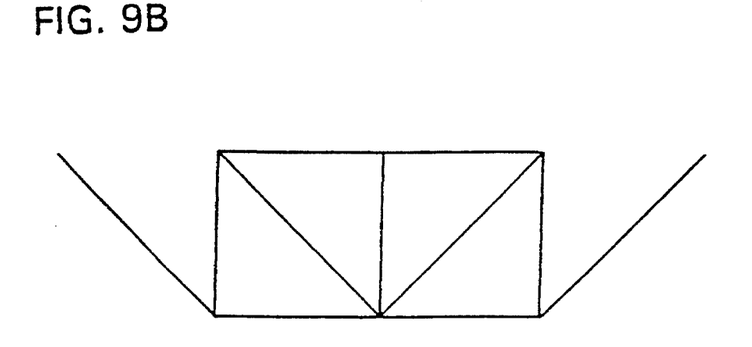
Figure 9C:
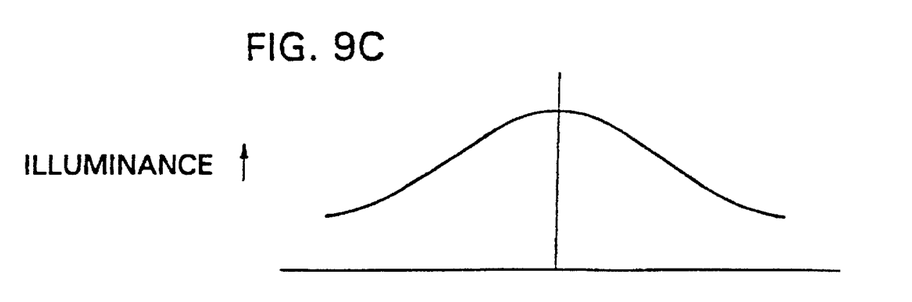

Further, in the above projection type liquid crystal display apparatus, since the illumination light beams enter the liquid crystal display device 40 at its three portions, i.e., a central portion and both side portions, three peaks appear in the illuminance distribution of the illumination light (see FIG. 9), which makes the brightness distribution of a projection screen non-uniform; that is, deteriorates its image quality.

Japanese Unexamined Patent Publication No. Sho. 63-182987 (published Jul. 28, 1988) proposes a projection type liquid crystal display apparatus in which light emitted from a light source is caused to enter one side end portion of a plurality of polarizing beam splitters aligned along the optical axis, and a light beam is output in one direction from one side face of the plurality of polarizing beam splitters.

However, the apparatus having the above configuration is large in the optical axis direction. Further, since the light beam emitted from the light source is inputted to the single polarizing beam splitter, the light incident surface is small. This causes a problem that part of the light beam emitted from the light source does not enter the polarizing beam splitter, i.e., is not utilized. Therefore, the efficiency of light utilization is low.

SUMMARY OF THE INVENTION

The present invention has been made in view of the above problems, and it is an object of the present invention to provide a projection type liquid crystal display apparatus which can improve the efficiency of light utilization, reduce the apparatus size, and provide a uniform brightness distribution of a projection screen.

To attain the above object, according to the invention, a projection type liquid crystal display apparatus that modulates light beams originating from a light source by a liquid crystal display device and projects, with magnification, the modulated light beams on a screen by a projection lens, comprises:

first polarizing beam splitters having respective first polarization separating surfaces arranged perpendicularly to each other, each of the first polarization separating surfaces serving to separate a light beam emitted from the light source into a P-polarization component and an S-polarization component by transmitting and outputting toward the liquid crystal display device one of those components and reflecting the other component;

first light beam reflecting elements disposed outside and adjacent to the respective first polarizing beam splitters, each for reflecting the P- or S-polarization component reflected by the first polarization separating surface and a light beam directly inputted from the light source;

second polarizing beam splitters disposed outside and adjacent to the respective first light beam reflecting elements and having respective second polarization separating surfaces, each of the second polarization separating surfaces serving to separate the light beam inputted from the light source and reflected by the first light beam reflecting element into a P-polarization component and an S-polarization component by transmitting one of those components and reflecting and outputting toward the liquid crystal display device the other component;

second light beam reflecting elements disposed outside and adjacent to the respective second polarizing beam splitters, each for reflecting toward the liquid crystal display device the P- or S-polarization component transmitted from the second polarization separating surface; and phase plates disposed in optical paths of P- or S-polarization components separated by the first and second polarization separating surfaces, for converting the incident P- or S-polarization components to S- or P-polarization components by rotating their polarization directions by 90°.

According to another aspect of the invention, a projection type liquid crystal display apparatus that modulates light beams originating from a light source by a liquid crystal display device and projects, with magnification, the modulated light beams on a screen by a projection lens, comprises:

first polarizing beam splitters having respective first polarization separating surfaces arranged perpendicularly to each other, each of the first polarization separating surfaces serving to separate a light beam emitted from the light source into a P-polarization component and an S-polarization component by transmitting and outputting toward the liquid crystal display device one of those components and reflecting the other component;

first phase plates disposed outside and adjacent to the respective first polarizing beam splitters, each for converting the incident P- or S-polarization component reflected by the first polarization separating surface to an S- or P-polarization component by rotating its polarization direction by 90°;

second polarizing beam splitters disposed outside and adjacent to the respective first phase plates and having respective second polarization separating surfaces, each of the second polarization separating surfaces serving to transmit the S- or P-polarization component produced by phase conversion by the first phase plate, and to separate a light beam directly inputted from the light source into a P-polarization component and an S-polarization component by transmitting and outputting toward the liquid crystal display device one of those components and reflecting the other component;

third polarizing beam splitters disposed outside and adjacent to the respective second polarizing beam splitters and having respective third polarization separating surfaces, each of the third polarization separating surfaces serving to transmit the S- or P-polarization component produced by phase conversion by the first phase phate, and to separate a light beam directly inputted from the light source to a P-polarization component and an S-polarization component by transmitting one of those components and reflecting and outputting toward the liquid crystal display device the other component;

light beam reflecting elements disposed outside and adjacent to the respective third polarizing beam splitters, each for reflecting toward the liquid crystal display device the S- or P-polarization component transmitted from the third polarization separating surface; and second phase plates disposed in optical paths of P- or S-polarization components separated by the first, second and third polarization separating surfaces, for converting the incident P- or S-polarization components to S- or P-polarization components by rotating their polarization directions by 90°.

According to a further aspect of the invention, in the projection type liquid crystal display apparatus described above, there are further provided third phase plates respectively disposed between the second polarizing beam splitters and the third polarizing beam splitters, each for converting the S- or P-polarization component produced by phase conversion by the first phase plate to a P- or S-polarization component, and for converting the P- or S-polarization component separated by the second polarization separating surface to an S- or P-polarization component.

According to the projection type liquid crystal display apparatuses having the above configurations, because plural sets of polarizing beam splitters, light beam reflecting elements and phase plates are so combined as to align in the direction perpendicular to the optical axis, light beams originating from the light source are output from the respective polarizing beam splitters and light beam reflecting elements in the form of small divided beams and illuminate the liquid crystal display device uniformly.

DESCRIPTION OF THE PREFERRED EMBODIMENTS

Projection type liquid crystal display apparatuses according to several embodiments of the present invention will be hereinafter described with reference to the accompanying drawings.

First, a projection type liquid crystal display apparatus according to a first embodiment will be described.

Figure 1:
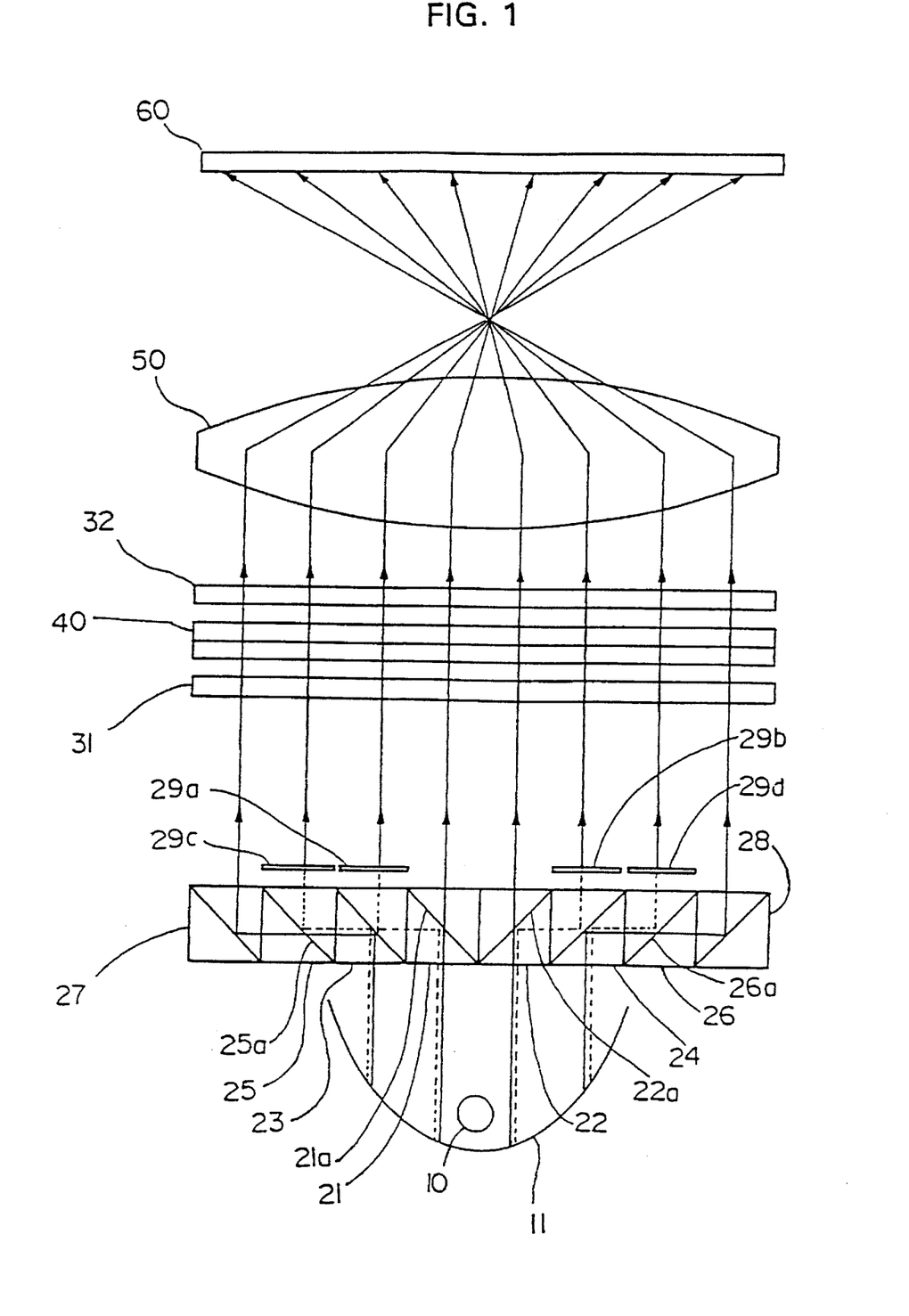
FIG. 1 is a block diagram showing a projection type liquid crystal display apparatus according to a first embodiment of the present invention.

FIG. 1 is a block diagram showing the projection type liquid crystal display apparatus according to the first embodiment, in which two pairs of polarizing beam splitters and two pairs of light beam reflecting elements are so combined as to align in the direction perpendicular to the optical axis.

In FIG. 1, a light source 10 is a high-intensity light source such as a metal halide lamp, a xenon lamp or a halogen lamp. Light beams emitted from the light source 10 are converted to parallel light beams having irregular polarization directions by being reflected by a parabolic reflecting mirror 11. Further, light components other than visible light are removed from the light beams emitted from the light source 10 by a cold mirror, an ultraviolet cutting filter, or the like (not shown).

First polarizing beam splitters 21 and 22 have first polarization separating surfaces 21a and 22a, respectively. The first polarizing beam splitters 21 and 22 are disposed adjacent to the optical axis so that the first polarization separating surfaces 21a and 22a are perpendicular to each other.

Each of the first polarizing beam splitters 21 and 22 is constructed such that one of two sloped faces of two right-angled prisms is coated with a dielectric multilayer semi-transparent film that serves as the polarization separating surface and then the two sloped faces are bonded to each other.

A dielectric multilayer anti-reflection film is applied to each of the following faces of the first polarizing beam splitters 21 and 22: entrance faces of the light beams emitted from the light source 10, exit faces of the transmission light beams, and exit faces of the reflection light beams.

Where the first polarizing beam splitters 21 and 22, first beam reflecting elements 23 and 24, second polarizing beam splitters 25 and 26, and second light beam reflecting elements 27 and 28 are bonded to each other with an adhesive, it is not necessary to apply an anti-reflection coating to the above-mentioned exit faces of the reflection light beams.

Each of the first polarizing beam splitters 21 and 22 of this embodiment transmits the P-polarization component of the light beam having irregular polarization directions emitted from the light source 10, and reflects its S-polarization component, thus separating those components.

According to an experiment conducted by the inventors, an intensity ratio (extinction ratio) between the P-polarization component and the S-polarization component in the transmission light output from each of the first polarizing beam splitters 21 and 22 was greater than 100:1.

The first light beam reflecting elements 23 and 24 are disposed outside and adjacent to the first polarizing beam splitters 21 and 22. Each of the first light beam reflecting elements 23 and 24 is constructed such that a dielectric multilayer film coating that reflects visible light, which is similar to the coating of a cold mirror, is applied to one of two sloped faces of two right-angled prisms. The first light beam reflecting elements 23 and 24 having the above configuration reflect all the incident light beam.

The second polarizing beam splitters 25 and 26 are disposed outside and adjacent to the first light beam reflecting elements 23 and 24. Having the same configuration as the first polarizing beam splitters 21 and 22, the second polarizing beam splitters 25 and 26 transmit the P-polarization component of the incident light beam, and reflects its S-polarization component.

The second light beam reflecting elements 27 and 28 are disposed outside and adjacent to the second polarizing beam splitters 25 and 26. Having the same configuration as the first light beam reflecting elements 23 and 24, the second light beam reflecting elements 27 and 28 reflects all the incident light beam.

Reference symbols 29a and 29b denote first phase plates, and 29c and 29d denote second phase plates. The first phase plates 29a and 29b are disposed adjacent to the faces of the first light reflecting elements 23 and 24 on the side of a liquid crystal display device 40. The second phase plates 29c and 29d are disposed adjacent to the faces of the second polarizing beam splitters on the side of the liquid crystal display device 40.

Each of the first and second phase plates 29a–29d is constructed such that a polyvinyl alcohol film is elongated, given birefringence for a half-wave plate, and then stuck to a glass substrate. A dielectric multilayer anti-reflection film is applied to the light beam incident faces of the first and second phase plates 29a–29d.

A polarizer 31 and an analyzer 32 are disposed upstream and downstream of the liquid crystal display device 40, respectively. Each of the polarizer 31 and the analyzer 32 is constructed in the following manner. First, a polarizing film is formed by absorbing, with proper orientation, iodine on a polyvinyl alcohol film. A polarizing plate is then formed by sticking triacetate protection film on both surfaces of the polarizing film. Finally, the polarizing plate is stuck to one surface of a glass substrate. A dielectric multilayer anti-reflection film is applied to the other surface of the glass substrate.

The liquid crystal display device 40 is constructed by sealing a liquid crystal between two glass substrates that are coated with transparent electrode films for pixel formation. Voltages applied to the respective pixels are controlled by video signals that are supplied from a video signal processing circuit and a liquid crystal driving circuit (both not shown).

A twisted nematic (TN) liquid crystal is used in this embodiment. The voltages applied to the respective pixels change the state of the liquid crystal, which in turn changes the polarization states of the incident light beams. By using the polarizer 31 and the analyzer 32, the incident light beams are intensity-modulated in accordance with an image.

To drive the liquid crystal, an active matrix type driving scheme is employed in which thin-film transistors as switching elements are formed for the respective pixels.

A projection lens 50 projects, with magnification, an image being displayed on the liquid crystal display device 40 onto a screen 60. The projection lens 50 is provided with a focus adjusting mechanism for adjusting focusing of a projected image, and a zooming mechanism for changing the image size without the need of changing the projection distance.

Next, referring to FIG. 1, a description will be made of an operation of the projection type liquid crystal display apparatus according to this embodiment having the above configuration.

In FIG. 1, a light beam emitted from the light source 10 is separated into a P-polarization component and an S-polarization component, which are linearly polarized components whose polarization directions are perpendicular to each other, by the first polarization separating surfaces 21a and 22a of the first polarizing beam splitters 21 and 22. Among those components, the P-polarization component passes through each of the first polarization separating surfaces 21a and 22a, and illuminates the liquid crystal display device 40. The S-polarization component is reflected by each of the first polarization separating surfaces 21a and 22a, and enters each of the first light beam reflecting elements 23 and 24.

The first light beam reflecting elements 23 and 24 reflect the S-polarization components reflected by the first polarization separating surfaces 21a and 22a. The reflected S-polarization components are subjected to 90°-rotation of their polarization direction while passing through the first phase plates 29a and 29b, and then illuminate the liquid crystal display device 40.

Light beams emitted from the light source 10 and inputted the first light beam reflecting elements 23 and 24 are reflected by those elements 23 and 24, and enter the second polarizing beam splitters 25 and 26, respectively, each of which separates the incident light beam into P- and S-polarization components.

Among those components, the P-polarization component passes through each of the second polarization separating surfaces 25a and 26a, and enters each of the second light beam reflecting elements 27 and 28. The P-polarization component is reflected by each of the second light beam reflecting elements 27 and 28, and illuminates the liquid crystal display device 40.

On the other hand, the S-polarization component is reflected by each of the second polarization separating surfaces 25a and 26a, and passes through each of the second phase plates 29c and 29d, to be converted to a P-polarization component, which illuminates the liquid crystal display device 40.

Thus, all the light beams emitted from the light source 10 illuminate the liquid crystal display device 40 after being converted to P-polarization components.

In the projection type liquid crystal display device according to this embodiment having the above configuration, the efficiency of converting the light beams emitted from the light source 10 to the linearly polarized components is approximately two times that in the projection type liquid crystal display apparatus of the second conventional example shown in FIG. 7. Thus, the efficiency of light utilization can be improved.

Further, since the light absorption in the polarizer 31 is reduced to about ⅙ of that in the projection type liquid crystal apparatus of the second conventional example, the temperature increase of the polarizer 31 can be prevented. Therefore, the polarizer 31 does not deteriorate, contributing to improvement of the image quality of projected images.

Furthermore, since the first polarizing beam splitters 21 and 22, first light beam reflecting elements 23 and 24, second polarizing beam splitters 25 and 26 and second light beam reflecting elements 27 and 28 are so combined as to align in the direction perpendicular to the optical axis, the polarizing optical system can be made smaller and lighter, to allow the entire apparatus to become more compact and lighter.

In the projection type liquid crystal display apparatus according to this embodiment, the dimension along the optical axis of the polarizing optical system including the first and second polarizing beam splitters 21, 22, 25 and 26 and other elements was made about a half of that of the conventional example. And the volume of the entire apparatus was made about 90% of the conventional example.

Figure 2A:
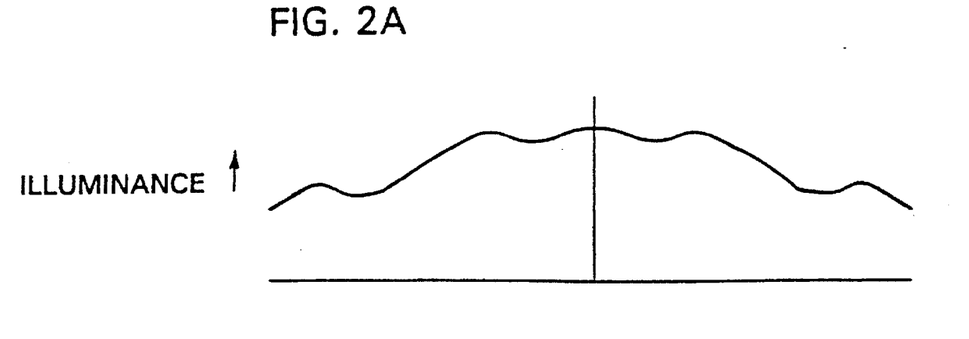
FIG. 2 illustrates an illuminance distribution of illumination light in the projection type liquid crystal display apparatus according to the first embodiment of the invention.
Figure 2B:
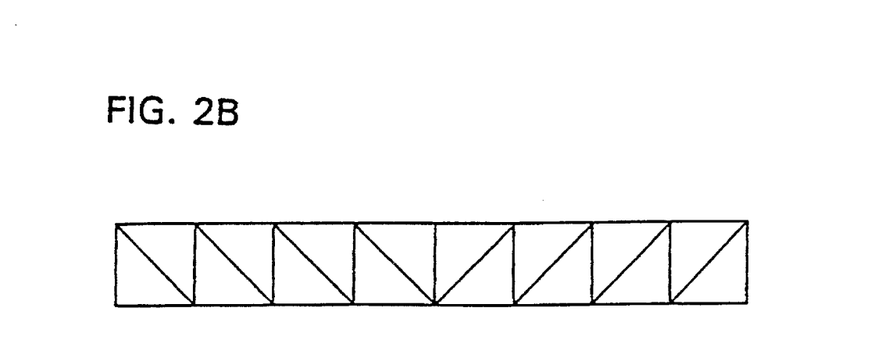
Figure 2C:
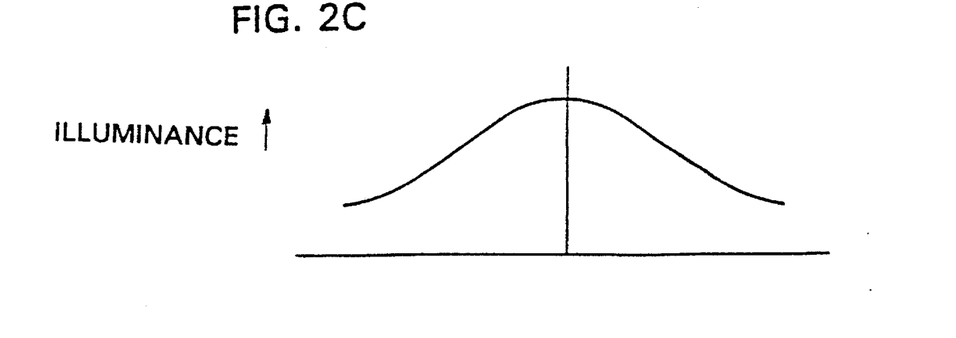

FIG. 2 illustrates an illuminance distribution of the illumination light in the projection type liquid crystal display apparatus according to this embodiment. As seen from FIG. 2, in the projection type liquid crystal display apparatus according to this embodiment, because the first polarizing beam splitters 21 and 22, first light beam reflecting elements 23 and 24, second polarizing beam splitters 25 and 26 and second light beam reflecting elements 27 and 28 are so combined as to form a long structure extending perpendicularly to the optical axis, and to produce exit faces that are divided into small sections, the uniformity of the illumination light for the liquid crystal display device 40 can be improved from the projection type liquid crystal display apparatus of the second conventional example. Thus, it becomes possible to provide a projection screen that is superior in illuminance uniformity.

Although in the projection type liquid crystal display apparatus according to the first embodiment the first phase plates 29a and 29b are disposed adjacent to the faces of the first light beam reflecting elements 23 and 24 on the side of the liquid crystal display device 40, they may be disposed between the first polarizing beam splitters 21 and 22 and the first light beam reflecting elements 23 and 24.

Although in the above embodiment the first and second phase plates 29a–29d are disposed in the optical paths of the S-polarization components, the same effects can be obtained by disposing those plates even in the optical paths of the P-polarization components in the case where the S-polarization components are used as illumination light beams for the liquid crystal display device 40. For example, the first and second phase plates 29a–29d may be disposed adjacent to the faces on the side of the liquid crystal display device 40 of the first polarizing beam splitters 21 and 22 and the second light beam reflecting elements 27 and 28, or between the second polarizing beam splitters 25 and 26 and the second light beam reflecting elements 27 and 28. In such cases, the polarizer 31 and the analyzer 32 are disposed such that the directions of their absorption axes are rotated by 90° from those in the above embodiment.

The first and second phase plates 29a–29d may be disposed in the optical paths of both of the S-polarization components and the P-polarization components. In this case, the optical paths of the S-polarization components may be either the positions adjacent to the faces of the first light beam reflecting elements 23 and 24 on the side of the liquid crystal display device 40, or the positions between the first polarizing beam splitters 21 and 22 and the first light beam reflecting elements 23 and 24. On the other hand, the optical paths of the P-polarization components may be either the positions adjacent to the faces of the second light beam reflecting elements 27 and 28 on the side of the liquid crystal display device 40, or the positions between the second polarizing beam splitters 25 and 26 and the second light beams reflecting elements 27 and 28.

In the above case, if half-wave plates are used for the first and second phase plates 29a–29d, illumination light beams whose polarization directions are rotated by 45° can be obtained by setting the optic axes of those plates at 22.5°.

The same effects can be obtained even by deviating the optic axes of the first and second phase plates 29a–29d by using two quarter-wave plates for each phase plate. In this case, the absorption axes of the polarizer 31 and the analyzer 32 are rotated by 45°, and the orientation direction of the liquid crystal is made suitable for such an arrangement.

The reflecting film of the first and second light beam reflecting elements 23, 24, 27 and 28 is not limited to the dielectric multilayer film, but may be formed by evaporating a metal such as aluminum or silver. Each of the first and second light beam reflecting elements 23, 24, 27 and 28 may be formed by evaporating a metal such as aluminum or silver, or a dielectric multilayer film on a glass substrate rather than a prism. The reflectance can be increased by utilizing internal total reflection by the sloped surface of a right-angled prism.

Each of the first and second light beam reflecting elements 23, 24, 27 and 28 may be formed of a plurality of prisms, rather than a single prism, which are so arranged that their reflecting surfaces exist in the same plane.

The liquid crystal display device 40 may use liquid crystals other than a twisted nematic (TN) liquid crystal, for instance, a supertwisted nematic (STN) liquid crystal, as long as they provide a display in combination with the polarizer 31 and the analyzer 32.

The polarizer 31 and the analyzer 32 are not limited to iodine type polarizing plates, but may be dye type polarizing plates.

Figure 3:
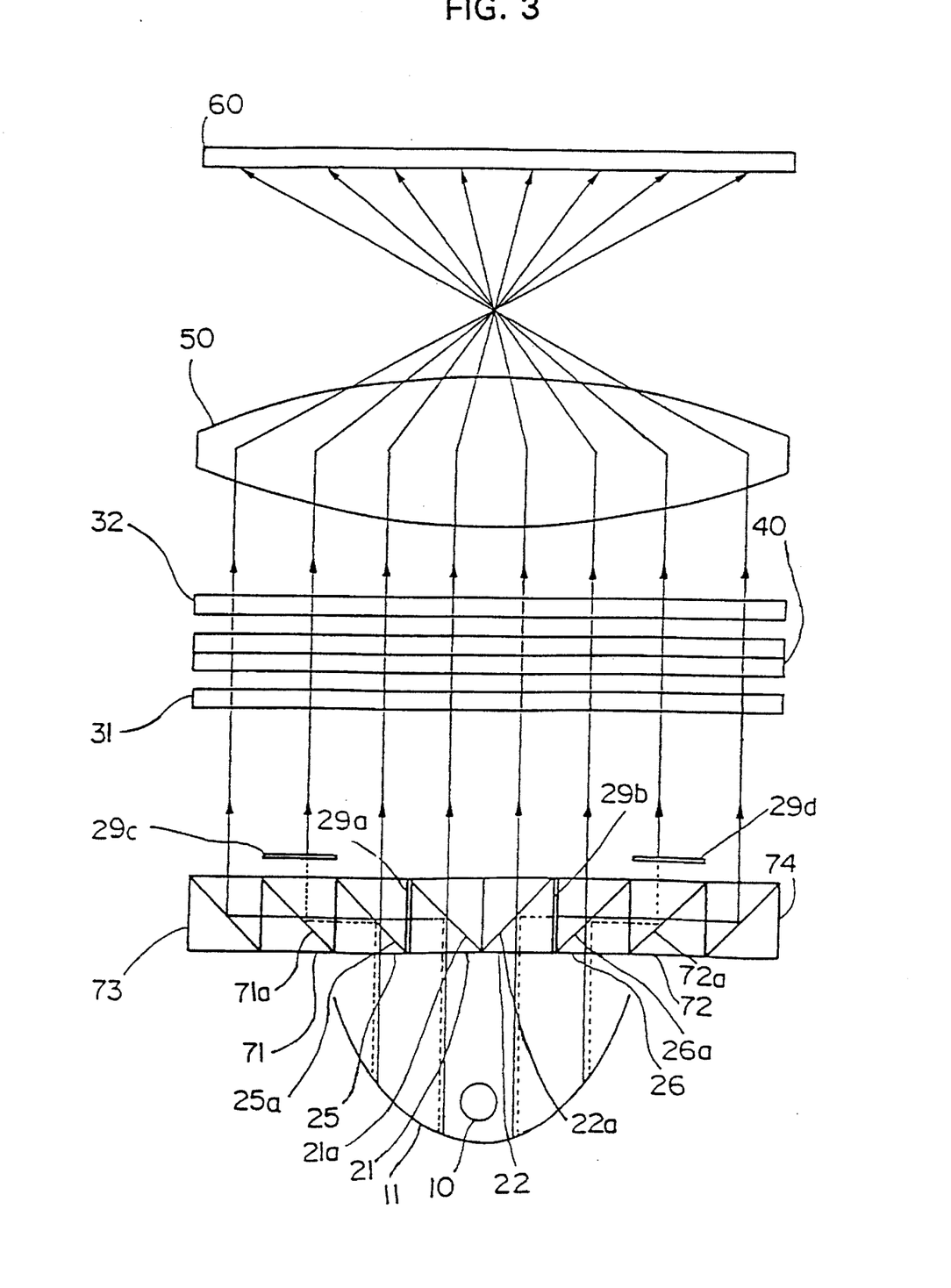
FIG. 3 is a block diagram showing a projection type liquid crystal display apparatus according to a second embodiment of the invention.

Next, a projection type liquid crystal display apparatus according to a second embodiment of the invention will be described with reference to FIG. 3. FIG. 3 is a block diagram showing the projection type liquid crystal display apparatus according to this embodiment.

In the projection type liquid crystal display apparatus according to this embodiment, first polarizing beam splitters 21 and 22, second polarizing beam splitters 25 and 26, third polarizing beam splitters 71 and 72, and light beam reflecting elements 73 and 74 are combined so as to align in the direction perpendicular to the optical axis. First phase plates 29a and 29b are disposed between the first polarizing beam splitters 21 and 22 and the second polarizing beam splitters 23 and 24, and second phase plates 29c and 29d are disposed adjacent to the faces of the third polarizing beam splitters 71 and 72 on the side of a liquid crystal display device 40.

Referring to FIG. 3, a description will be made of an operation of the projection type liquid crystal display apparatus according to this embodiment having the above configuration.

In FIG. 3, light beams emitted from a light source 10 are separated into P-polarization components and S-polarization components by first polarization separating surfaces 21a and 22a of the first polarizing beam splitters 21 and 22.

Among those polarization components, the P-polarization components pass through the first polarization separating surfaces 21a and 22a, and illuminate the liquid crystal display device 40.

The S-polarization components are reflected by the first polarization separating surfaces 21a and 22a, and then converted to P-polarization components while passing through the first phase plates 29a and 29b. The P-polarization components thus obtained pass through second polarization separating surfaces 25a and 26a of the second polarizing beam splitters 25 and 26 and third polarization separating surfaces 71a and 72a of the third polarizing beam splitters 71 and 72, to enter the light beam reflecting elements 73 and 74. The light beam reflecting elements 73 and 74 reflect the incident P-polarization components, and the reflected P-polarization components illuminate the liquid crystal display device 40.

Light beams emitted from the light source 10 and directly inputted to the second polarizing beam splitters 25 and 26 are separated into P-polarization components and S-polarization components by the second polarization separating surfaces 25a and 26a.

Among those polarization components, the P-polarization components pass through the second polarization separating surfaces 25a and 26a, and illuminate the liquid crystal display device 40.

The S-polarization components are reflected by the second polarization separating surfaces 25a and 26a, and enter the third polarizing beam splitters 71 and 72. The S-polarization components are then reflected by the third polarization separating surfaces 71a and 72a, and converted to P-polarization components while passing through the second phase plates 29c and 29d. The P-polarization components thus produced illuminate the liquid crystal display device 40.

The projection type liquid crystal display apparatus according to this embodiment having the above configuration can provide similar effects to those obtained by the projection type liquid crystal display apparatus according to the first embodiment.

Figure 4A:
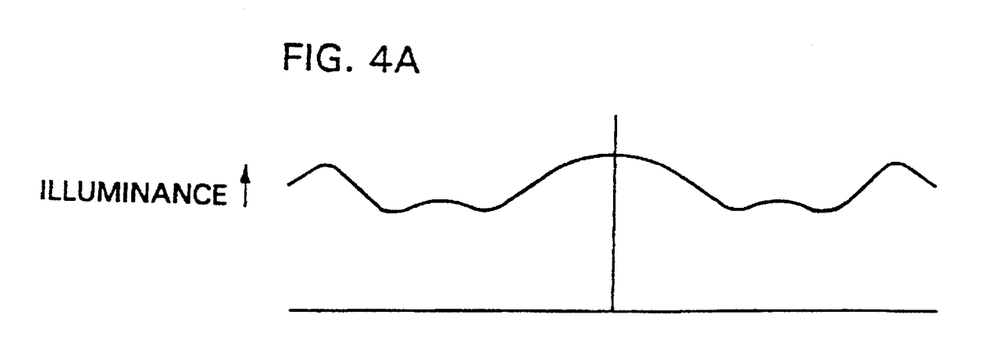
FIG. 4 illustrates an illuminance distribution of illumination light in the projection type liquid crystal display apparatus according to the second embodiment of the invention.
Figure 4B:
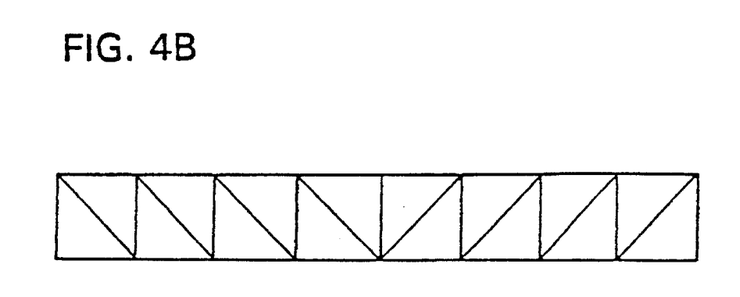
Figure 4C:
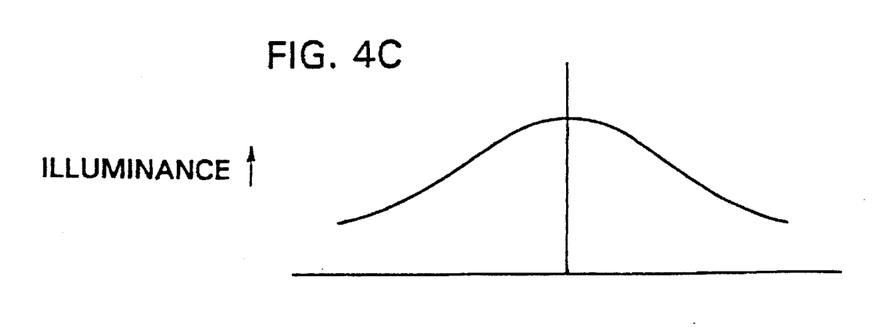

FIG. 4 illustrates an illuminance distribution of the illumination light in the projection type liquid crystal display apparatus according to this embodiment. As seen from FIG. 4, the uniformity of the illumination light is superior to that in the projection type liquid crystal display apparatus of the second conventional example.

Modifications similar to those described above in connection with the projection type liquid crystal display apparatus according to the first embodiment can also be made to that according to the second embodiment.

Figure 5:
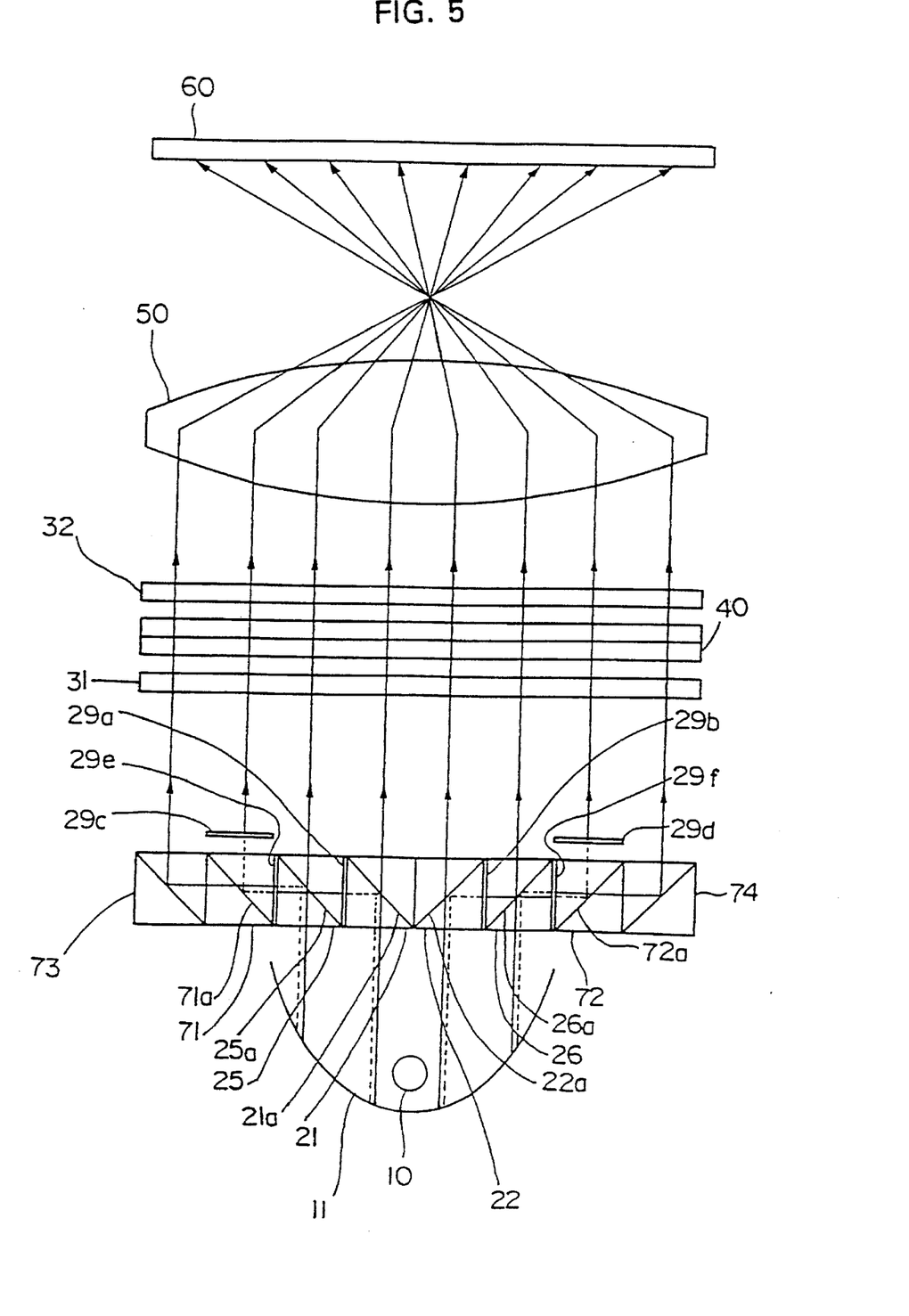
FIG. 5 is a block diagram showing a projection type liquid crystal display apparatus according to a third embodiment of the invention.

Next, a projection type liquid crystal display apparatus according to a third embodiment of the invention will be described with reference to FIG. 5. FIG. 5 is a block diagram showing the projection type liquid crystal display apparatus according to this embodiment.

In the projection type liquid crystal display apparatus according to this embodiment, third phase plates 29e and 29f are disposed between the second polarizing beam splitters 25 and 26 and the third polarizing beam splitters 71 and 72 of the second embodiment.

Referring to FIG. 5, a description will be made of an operation of the projection type liquid crystal display apparatus according to this embodiment having the above configuration.

In FIG. 5, light beams emitted from the light source 10 are separated into P-polarization components and S-polarization components by the first polarization separating surfaces 21a and 22a of the first polarizing beam splitters 21 and 22.

Among those polarization components, the P-polarization components pass through the first polarization separating surfaces 21a and 22a, and illuminate the liquid crystal display device 40.

The S-polarization components are reflected by the first polarization separating surfaces 21a and 22a, and converted to P-polarization components while passing through the first phase plates 29a and 29b. The P-polarization components thus produced pass through the second polarization separating surfaces 25a and 26a of the second polarizing beam splitters 25 and 26, and are restored to S-polarization components while passing through the third phase plates 29e and 29f. The S-polarization components thus obtained enter the third polarizing beam splitters 71 and 72.

The S-polarization components are then reflected by the third polarization separating surfaces 71a and 72a, and again converted to P-polarization components while passing through the second phase plates 29c and 29d. The P-polarization components thus produced illuminate the liquid crystal display device 40.

Light beams emitted from the light source 10 and directly inputted to the second polarizing beam splitters 25 and 26 are separated into P-polarization components and S-polarization components by the second polarization separating surfaces 25a and 26a.

Among those polarization components, the P-polarization components pass through the second polarization separating surfaces 25a and 26a, and illuminate the liquid crystal display device 40.

The S-polarization components are reflected by the second polarization separating surfaces 25a and 26a, and converted to P-polarization components while passing through the third phase plates 29e and 29f. The P-polarization components thus obtained pass through the third polarization separating surfaces 71a and 72a of the third polarizing beam splitters 71 and 72, and enter the light beam reflecting elements 73 and 74.

The light beam reflecting elements 73 and 74 reflects the incident p-polarization components, and the reflected P-polarization components illuminate the liquid crystal display device 40.

Figure 6A:
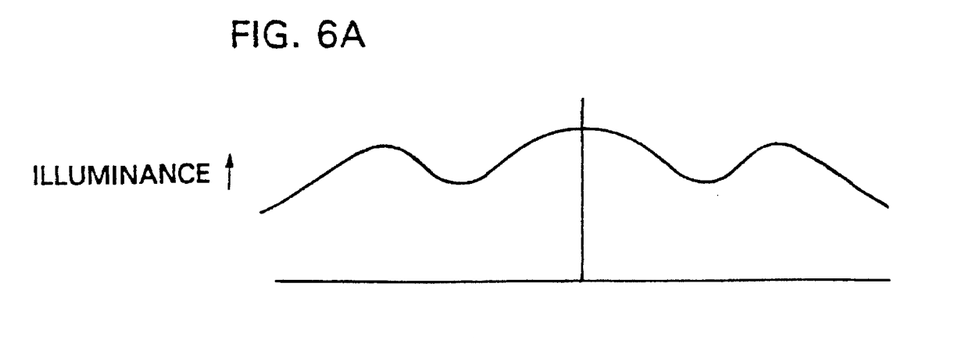
FIG. 6 illustrates an illuminance distribution of illumination light in the projection type liquid crystal display apparatus according to the third embodiment of the invention.
Figure 6B:
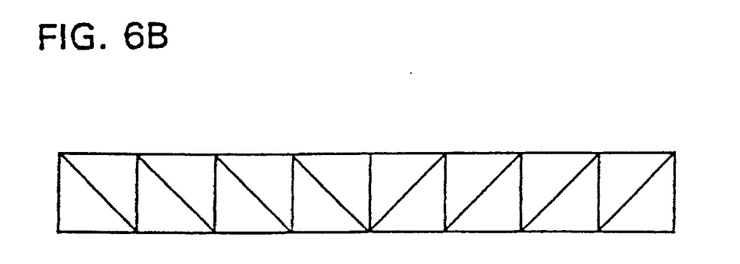
Figure 6C:
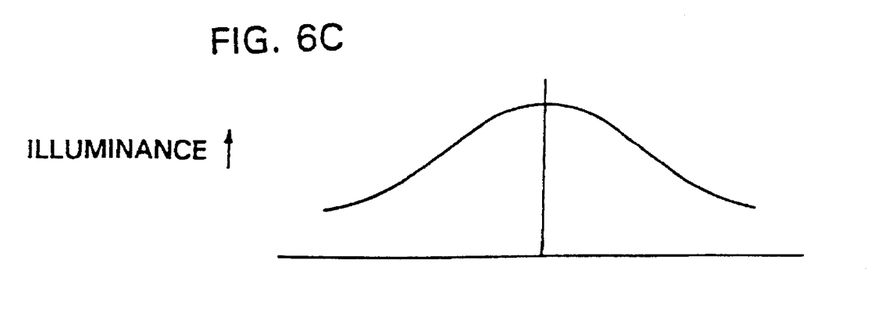

As shown in FIG. 6, the projection type liquid crystal display apparatus according to the this embodiment having the above configuration provides an illuminance distribution of the illumination light which distribution is approximately equivalent to that in the second conventional example. However, the projection type liquid crystal display apparatus according to this embodiment provides similar effects to those obtained by the above-described first and second embodiments in improving the efficiency of light utilization and the quality of projected images and making the apparatus smaller and lighter.

Modifications similar to those described above in connection with the first and second embodiments can also be made to the projection type liquid crystal display apparatus according to the third embodiment.

As described above, the projection type liquid crystal display apparatus according to the invention can improve the efficiency of light utilization, reduce the apparatus size, and provide a uniform brightness distribution of a projection screen.

What is claimed is:

1. A projection type liquid crystal display apparatus which modulates light beams originating from a light source by a liquid crystal display device and projects the modulated light beams by a projection lens, comprising:

first polarizing beam splitters having respective first polarization separating surfaces arranged perpendicularly to each other, each of the first polarization separating surfaces serving to separate a light beam emitted from the light source into a P-polarization component and an S-polarization component by transmitting and outputting toward the liquid crystal display device one of those components and reflecting the other component;

first light beam reflecting elements disposed outside and adjacent to the respective first polarizing beam splitters, each for reflecting the P- or S-polarization component reflected by the first polarization separating surface and a light beam directly inputted from the light source;

second polarizing beam splitters disposed outside and adjacent to the respective first light beam reflecting elements and having respective second polarization separating surfaces, each of the second polarization separating surfaces serving to separate the light beam inputted from the light source and reflected by the first light beam reflecting element into a P-polarization component and an S-polarization component by transmitting one of those components and reflecting and outputting toward the liquid crystal display device the other component;

second light beam reflecting elements disposed outside and adjacent to the respective second polarizing beam splitters, each for reflecting toward the liquid crystal display device the P- or S-polarization component transmitted from the second polarization separating surface; and phase plates disposed in optical paths of P- or S-polarization components separated by the first and second polarization separating surfaces, for converting the incident P- or S-polarization components to S- or P-polarization components by rotating their polarization directions by 90°.

2. A projection type liquid crystal display apparatus which modulates light beams originating from a light source by a liquid crystal display device and projects the modulated light beams by a projection lens, comprising:

first polarizing beam splitters having respective first polarization separating surfaces arranged perpendicularly to each other, each of the first polarization separating surfaces serving to separate a light beam emitted from the light source into a P-polarization component and an S-polarization component by transmitting and outputting toward the liquid crystal display device one of those components and reflecting the other component;

first phase plates disposed outside and adjacent to the respective first polarizing beam splitters, each for converting the incident P- or S-polarization component reflected by the first polarization separating surface to an S- or P-polarization component by rotating its polarization direction by 90°;

second polarizing beam splitters disposed outside and adjacent to the respective first phase plates and having respective second polarization separating surfaces, each of the second polarization separating surfaces serving to transmit the S- or P-polarization component produced by phase conversion by the first phase plate, and to separate a light beam directly inputted from the light source into a P-polarization component and an S-polarization component by transmitting and outputting toward the liquid crystal display device one of those components and reflecting the other component;

third polarizing beam splitters disposed outside and adjacent to the respective second polarizing beam splitters and having respective third polarization separating surfaces, each of the third polarization separating surfaces serving to transmit the S- or P-polarization component produced by phase conversion by the first phase plate, and to separate a light beam directly inputted from the light source to a P-polarization component and an S-polarization component by transmitting one of those components and reflecting and outputting toward the liquid crystal display device the other component;

light beam reflecting elements disposed outside and adjacent to the respective third polarizing beam splitters, each for reflecting toward the liquid crystal display device the S- or P-polarization component transmitted from the third polarization separating surface; and second phase plates disposed in optical paths of P- or S-polarization components separated by the first, second and third polarization separating surfaces, for converting the incident P- or S-polarization components to S- or P-polarization components by rotating their polarization directions by 90°.

3. The projection type liquid crystal display apparatus according to claim 2, further comprising thier phase plates respectively disposed between the second polarizing beam splitters and the third polarizing beam splitters, each for converting the S-or P-polarization component produced by phase conversion by the first phase plate to a P- or S-polarization component, and for converting the P- or S-polarization component separated by the second polarization separating surface to an S- or P-polarization component.

* * * * *